(12) United States Patent
Fernandez Garcia

(10) Patent No.: US 8,905,356 B2
(45) Date of Patent: Dec. 9, 2014

(54) AIR TO AIR REFUELING SYSTEM WITH AN AUTONOMOUS ELECTRICAL SYSTEM

(75) Inventor: Francisco Javier Fernandez Garcia, Getafe (ES)

(73) Assignee: EADS Construcciones Aeronáuticas, S.A., Madrid (ES)

( * ) Notice: Subject to any disclaimer, the term of this patent is extended or adjusted under 35 U.S.C. 154(b) by 484 days.

(21) Appl. No.: 13/274,762

(22) Filed: Oct. 17, 2011

(65) Prior Publication Data

US 2013/0009011 A1 Jan. 10, 2013

(30) Foreign Application Priority Data

Jul. 6, 2011 (ES) .................................. 201131151

(51) Int. Cl.
*B64D 39/00* (2006.01)
*B64D 39/02* (2006.01)
(52) U.S. Cl.
CPC ...................................... *B64D 39/02* (2013.01)
USPC ...................................... 244/135 A; 244/1 TD
(58) Field of Classification Search
CPC ............................... B64D 39/00; B64D 39/02
USPC .................................. 244/1 TD, 135 R, 135 A
See application file for complete search history.

(56) References Cited

U.S. PATENT DOCUMENTS

| | | | | |
|---|---|---|---|---|
| 2,973,171 A | * | 2/1961 | Ward et al. | 244/135 A |
| 3,674,049 A | * | 7/1972 | Macgregor | 137/355.2 |
| 5,141,178 A | | 8/1992 | Alden et al. | |
| 5,996,939 A | | 12/1999 | Higgs et al. | |
| 7,200,567 B2 | * | 4/2007 | Caci et al. | 705/26.81 |
| 7,665,479 B2 | * | 2/2010 | Cutler et al. | 137/1 |
| 7,692,331 B2 | * | 4/2010 | Langlois et al. | 307/59 |
| 2006/0208132 A1 | | 9/2006 | Jones | |
| 2010/0001124 A1 | * | 1/2010 | Feldmann | 244/58 |

OTHER PUBLICATIONS

European Search Report issued Apr. 17, 2013, in Application No. EP 12 17 4656.

* cited by examiner

*Primary Examiner* — Rob Swiatek
*Assistant Examiner* — Marc Burgess
(74) *Attorney, Agent, or Firm* — Oblon, Spivak, McClelland, Maier & Neustadt, L.L.P.

(57) ABSTRACT

A system for air to air refueling with an autonomous electrical system, comprising at least two hose and drogue devices (3, 5) housed in gondolas located underneath the wings of the aircraft, each refueling device comprising a plurality of components actuated by electrical actuators and its electrical system that is formed by two subsystems, each one of them comprising: a) Electric generator (11) actuated by a wind turbine (25) located in one of said gondolas; b) Energy storage device (19); c) Connection to the aircraft electrical system (15, 17); d) administrating device (21) equipped with means for ensuring the generation and storage of the energy required for responding to the electrical needs of the refueling system without recurring to the electrical system of the aircraft except in the event that the energy stored in said accumulation device (19) falls below a preset value.

15 Claims, 1 Drawing Sheet

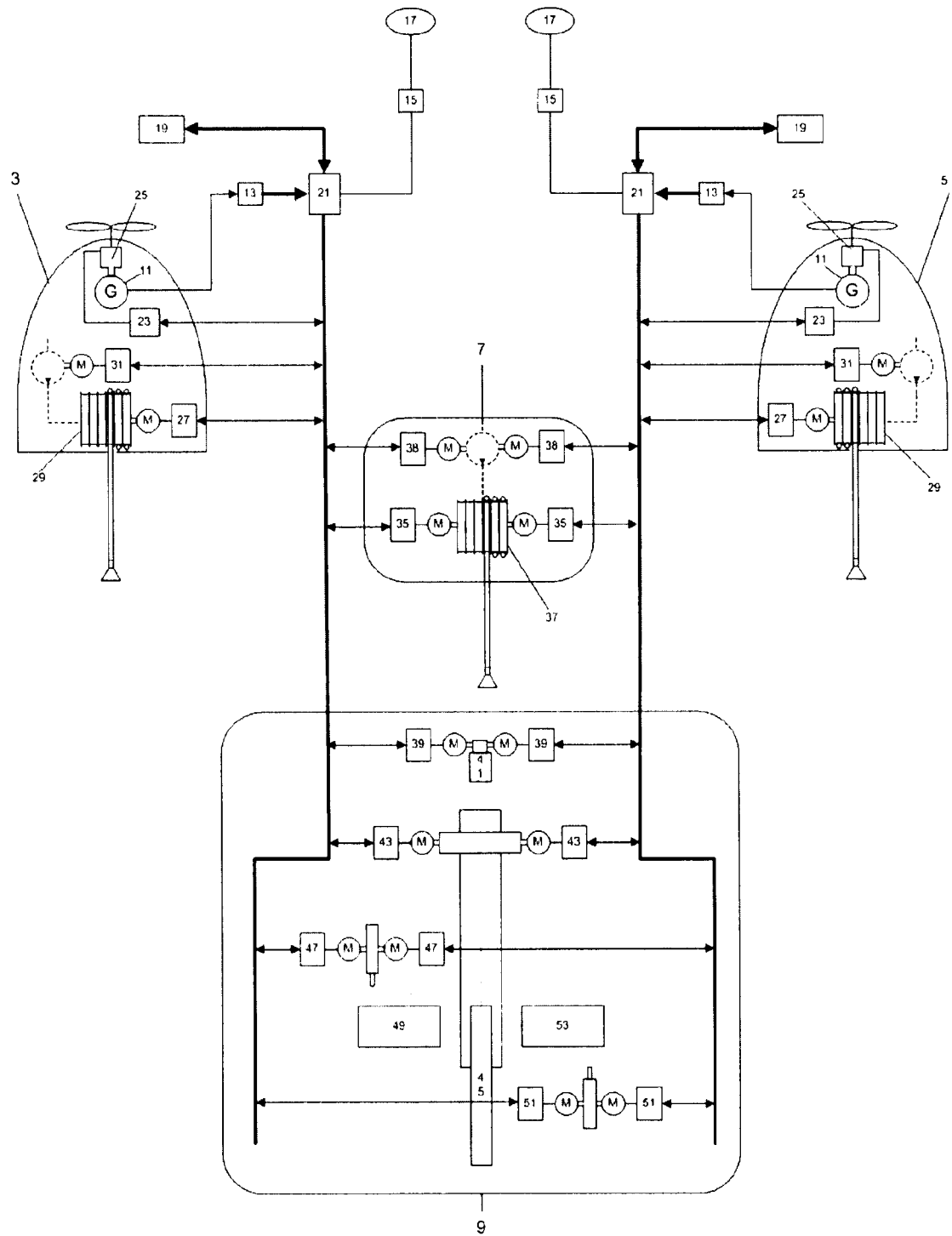

AIR TO AIR REFUELING SYSTEM WITH AN AUTONOMOUS ELECTRICAL SYSTEM

FIELD OF THE INVENTION

This invention refers to an air to air refueling system and, more specifically, to its electrical system.

BACKGROUND

One known system for conducting air to air refueling operations is based on the use of a refueling device with a rigid mast for connecting the tanker aircraft to the receiver aircraft in flight, which is basically a telescoping or extendable boom joined to the underside of the tanker aircraft by means of an articulating element that enables the flow of fuel from the tanker aircraft to the receiver aircraft. In the tanker aircraft the operator visually controls the all of the steps and procedures to carry out a secure refueling operation by maneuvering the beam until it physically connects to the receptacle of the receiver aircraft.

Another known system for conducting air to air refueling operations is a refueling device with a flexible hose and a drogue that is dragged from the tanker aircraft. The basked is an accessory joined to the hose by means of a valve for the purpose of stabilizing it during flight and providing a channel that assists in inserting the probe of the receiver aircraft into the hose. The hose is connected to a drum unit so that when the hose is not in use it is completely reeled into the drum unit. The receiver aircraft has a probe which is a rigid arm situated on the fuselage or nose of the aircraft. The probe is normally retracted when it is not in use, especially in high velocity aircraft.

A tanker aircraft can be equipped with all or some of the following devices:

Two hose and drogue refueling devices housed in a gondola suspended underneath the wings of the tanker aircraft.

A hose and drogue refueling device located in the central fuselage.

A rigid beam refueling device located in the tail of the tanker aircraft.

During operations these devices require important power outlays that must covered by the power systems of the tanker aircraft, thus reducing its availability for the rest of the devices in the tanker aircraft, and, if the situation arises, overloading the capacity of the power generators of the base aircraft, be it hydraulic power or electrical power.

In the case of hose and drogue refueling systems, the components which consume most energy are the fuel pump and the device for moving the winding drum onto which the hose is reeled. In the known systems, when they are in position in the gondola the fuel pump is usually dragged by a wind turbine, such as a RAT ("Ram Air Turbine") the speed of which is controlled by variations of the propeller pace. Thus little energy is required from the tanker aircraft (the only need being that of the actuator for the propeller speed controller of the wind turbine). In the case of systems located underneath the central fuselage, the fuel pump is generally dragged by a hydraulic motor fed from the hydraulic system of the tanker aircraft.

The device for moving the winding drum is fed either by the hydraulic system of the tanker aircraft or by the electrical system of the tanker aircraft.

In the case of refueling systems by a rigid mast, the components demanding most energy are the actuation devices of the airfoils for controlling the flight, the device for moving the telescoping boom and the device for hoisting the mast, which can be fed from the hydraulic system or electrical system of the tanker aircraft.

To cover the added demand for energy of all of the refueling devices during an air to air refueling mission, the hydraulic and/or electric power systems must have sufficient capacity to cover both the demands of said refueling devices and the demands pertaining to the tanker aircraft: flight controls, avionics, armament, radar, etc., which implies oversizing its electrical system, of which there is already an observable growth tendency due to the substitution of hydraulic devices for electrical devices in aircraft.

This invention is oriented towards a solution to this problem.

SUMMARY OF THE INVENTION

One object of the present invention is to provide an air to air refueling system with an autonomous electrical system and a method for operating the same.

Another object of the present invention is to provide an air to air refueling system with the capacity of reusing the power generated during a refueling mission and an operating method of the same.

Another object of the present invention is to provide an air to air refueling system that facilitates the conversion of a commercial aircraft into a tanker aircraft.

In a first aspect, these and other objectives are obtained with a refueling system that comprises at least two hose and drogue refueling devices housed in gondolas deployed underneath the wings of the aircraft, each refueling devices comprising a plurality of components actuated by electrical actuators, in which its electrical system is formed by two subsystems comprising each one of them: a) an electric generator actuated by a wind turbine located in one of said hose and drogue refueling devices; b) an energy storage device; c) a connection to the electrical system of the aircraft; d) a control device equipped with means for ensuring the generation and storage of the power needed to fulfill the electrical demands of the refueling system without tapping into the electrical system of the aircraft, except in the case that the stored power in said energy storing device drops below a preset value.

In embodiments of the present invention, said hose and drogue refueling devices include at least the following electrical actuators: the velocity control actuator for the propeller of the wind turbine, the actuator for the winding drum of the hose and the actuator for the fuel pump. Thus electrical actuators are used for the main components of hose and drogue refueling devices.

In embodiments of the present invention, the refueling system also comprises a third hose and drogue refueling device in the central fuselage that includes at least the actuator for the winding drum of the hose and the actuator for the fuel pump, and/or a refueling device with a rigid beam, which includes at least the following electrical actuators: the actuator for the hoisting drum of the beam, the actuator for moving the telescoping boom of the beam and the actuators for the airfoils of the mast. In this manner a refueling system is obtained that is equipped with an electrical system which, to a large extent, is autonomous with up to four refueling devices for increasing the refueling capacity of the tanker aircraft.

In embodiments of the present invention, said energy storage device comprises one or more of the following elements or a combination of them: a battery, preferably lithium, an ultracapacitor, and a flywheel. In this way a storage device is obtained with sufficient capacity for providing an almost complete autonomy to the electrical system with regard to the electrical system of the tanker aircraft.

In embodiments of the present invention: the voltage of the distribution network of said electrical subsystems is 270 Vdc; the generators are AC generators with a preferred voltage of between 2 and 10 Kw, and said electrical subsystems include rectifiers associated to them; said connection to the electrical system of the aircraft is equipped to provide electric power at a voltage of 270 Vdc. In this manner an electrical system is achieved that is adapted to the needs of an onboard aircraft system, especially in regard to the reduction of cabling and weight.

In a second aspect, the previously mentioned objectives are achieved by means of a method for administrating the electrical energy flow in an air to air refueling system installed in a tanker aircraft, the refueling system comprising at least two hose and drogue refueling devices housed in gondolas deployed underneath the wings, each refueling device comprising a plurality of components actuated by electrical actuators, comprising the tanker aircraft an electrical system with means for generating electric power, which comprises the steps of: a) using the electrical system of the refueling system that comprises two electric generators actuated by wind turbines and two storage devices before commencing a refueling mission so as to charge said storage devices with the energy generated by said electric generators; b) administrating the power flow during a refueling mission using said electrical generators and said electrical energy storage devices to provide the energy required by said electrical actuators when they act as power consumers and storing said storing devices the electric power provided by said electrical actuators when they act as power generators.

In embodiments of the present invention in said steps a) and b), energy generated by the electrical system of the tanker aircraft is also used if it becomes necessary to maintain the energy stored in said energy storage device above a preset value, thus the supplying of power from the electrical system of the aircraft to the electrical system of the refueling system at a constant present voltage is produced. In this way the optimization of the respective systems of the tanker aircraft and the refueling system is obtained.

In the embodiments of the present invention the method is applicable to systems that comprise the same type of refueling devices mentioned previously.

In a third aspect, the mentioned previously objectives are obtained with a method of converting a commercial aircraft into a tanker aircraft that comprises the steps of:
  installing in the commercial aircraft an air to air refueling system with the features mentioned previously;
  connecting the electrical system of the refueling system to the electrical system of the aircraft in such a way that the first is able to receive from the second, at a constant preset voltage, the power needed to maintain the stored energy in its energy storage devices above a preset value in the course of a refueling mission.

Other features and advantages of the present invention will be disclosed in the detailed description which follows from an illustrative embodiment of its object in relation to the drawing that accompanies it.

BRIEF DESCRIPTION OF THE DRAWINGS

FIG. 1 is a block diagram of the electrical system of an air to air refueling system connected to the electrical system of the tanker aircraft.

DETAILED DESCRIPTION OF THE PREFERRED EMBODIMENTS

In the preferred embodiment that we are going to describe, the refueling system is comprised by all of the previously mentioned refueling devices, namely, two hose and drogue devices in gondolas suspended under the wings of the tanker aircraft, a hose and drogue device located on the underside of the central fuselage of the tanker aircraft, and a rigid beam device located in the tail of the tanker aircraft.

In a system of this type the main features of the operation of the refueling devices and their power balance are the following:

The operation on land of the refueling devices for maintenance and autodiagnostic activities, for example, which requires power independent of the aircraft, either hydraulic or electric, as the case may be.
  The hose and drogue devices housed in the gondolas generally are operated simultaneously. The rigid beam device is operated in an independent manner, hence, without coinciding with the hose and drogue devices.
  In the hose and drogue devices, during deployment of the same the aerodynamic forces on the drogue on the end of the hose permanently pull at it, for which the control system for moving the drum behaves like a power generator. The power generated dissipates internally in the form of heat.
  In hose and drogue devices, during contact with a receiver aircraft there are periods of net power consumption and periods of net power generation, depending on the movements of the receiver aircraft. When the receiver aircraft separates from the tanker aircraft energy is generated, whereas, when it approaches the device consumes power to reel in the hose. As in the previous case, the energy generated dissipates internally in the form of heat.
  In hose and drogue devices power is consumed during the reeling in of the hose upon completing the refueling.
  In the rigid mast device, during deployment of the same the hoisting system sustains the weight of the mast, and thus behaves as a generator. The energy generated dissipates internally in the form of heat. The control system of the telescoping beam also behaves as a generator when the beam is extended with the mast deployed in angles below horizontal and during braking in the final positions of extension. The energy generated likewise dissipates internally in the form of heat.
  In the rigid mast device, during contact with the receiver aircraft, in the actuator for the telescoping beam there are periods of net power consumption with periods of net power generation, depending on the movement of the receiver aircraft. As in the previous case, the energy generated is dissipated internally in the form of heat.
  In the rigid mast device, following disconnection there are punctual operations of very brief duration, such as emergency retraction (retraction of the telescoping beam at a speed of 3 m/s for two seconds) in which the actuator for the telescoping beam requires a peak in power consumption on the order of up to 25 Kw, which could require the use of the overcharge capacity of the power generators of the tanker aircraft.
  In the rigid mast device, when hoisting the mast the hoisting actuator consumes power from the tanker aircraft.
  In the rigid mast device, both during deployment, in the free flight phase, as well as during coupled flight with a receiver aircraft, the actuator for the aerodynamic surfaces for flight control alternates periods of consumption with generation of energy, depending on the direction of the movement of the surfaces with respect of the aerodynamic loads and inertia. The energy generated in dissipated internally in the form of heat.

That said, we will now review in greater detail the refueling system in accordance with the invention:

It is equipped with its own sources for generating power and electric power storage, and so does not need, as occurs in the earlier art, the electrical system of the tanker aircraft to supply all of the electric power it needs, which requires sizing the same to be able to handle the power spikes of the refueling devices which operate simultaneously.

It is equipped with storage capacity for the power generated by the refueling devices, thus it does not require a large power dissipation capacity for administering the power generated during refueling operations.

It is connected to the electrical system of the tanker aircraft so as to receive electric power only in those momentary situations in which the demand of the refueling systems is not covered by the generating capacity and stored power.

Following FIG. 1 below we will describe the main components of the refueling electrical system in accordance with the invention.

The system is formed by two symmetric subsystems, each one of them fed by half of the refueling devices, that is, hose and drogue device 3, 5 located underneath the wings, hose and drogue device 7 located in the central fuselage and the device for rigid mast 9, each one of said elements equipped with the following elements:

An AC generator 11, with a power output of approximately 5 Kw, generally with a variable frequency, integrated in one of the gondolas which house a hose and drogue device underneath the wings that is dragged by wind turbine 25 of the type currently used for actuating the fuel pump.

A rectifier 13 associated to AC generator 11 and sized in accordance with its capacity for converting the generated AC electricity into 270 Vdc electricity for its distribution in the refueling electrical system.

A rectifier 15 that makes possible the connection to the AC electrical system of the tanker aircraft, transforming the energy produced by an AC generator 17 into 270 Vdc for its distribution in the refueling electrical system. This rectifier 15 is appropriately sized only for distributing the needed electrical power to momentarily supplement the capacity of the refueling electrical system.

An electric power storage device 19 which may be a set of batteries, preferably lithium, a set ultracapacitors, flywheel or a combination thereof.

An energy flow administrating element 21 between the different branches of the system and for electrical protection and isolation in the event of failures.

The diverse actuators using DC using 270 Vdc electrical feeds, in which half of each one is fed by an electrical subsystem (either having a twin motor or two independent motors), among which there may be included:

Actuator 23 for controlling the propeller speed of wind turbine 25;

Actuator 27 for hose winding drum 27 of the hose and drogue device housed in a gondola suspended underneath the wing;

Actuator 35 for hose winding drum 37 of the hose and drogue device located in the central fuselage;

Actuator 38 for the fuel pump of a hose and drogue device located in the central fuselage.

Actuator 39 for hoisting drum 41 of the rigid mast device;

Actuator 43 for telescoping beam 45 of the rigid mast device;

Actuators 47, 51 for flight airfoils 49, 53 for the rigid mast device;

Said subsystems likewise comprise auxiliary and control elements (not depicted in FIG. 1 for the sake of simplicity) and, in particular, electronic control units associated to each one of said actuators.

Following the description of the system in accordance with the invention, we now move on to describe the operating method of the same.

A modern tanker aircraft carries out both transport missions in which the refueling system is deactivated, as well as refueling missions.

During transport missions and during approach phases in the refueling zone of refueling missions, storage devices 19 of the electrical system (batteries, condensers, flywheels or a combination thereof) are recharged by the power provided by generators 11 through their rectifiers 13 or, as the case may be, by the electrical system of the tanker aircraft through rectifiers 15, with a low charging power so as to avoid causing an important consumption in the base aircraft. The goal is to reach approximately 70% to 80% power storage of the installed capacity of storage devices 19 at the start of the refueling mission When the refueling devices are activated generators 11 are also enabled (if they were not already), which enables autonomous supplying of electrical power for operating the refueling devices.

While operating each actuator for a refueling device acts in consecutive moments as a power consumer or generator. The average net power balance during the refueling mission is the net power consumption (with an average consumption of around 7-10 Kw), which is covered by the capacity of generators 11. The power momentarily generated by the actuators that behave like generators is used by other actuators that behave like consumers in this moment, in such a way that the total electrical demand of the subsystem is only the difference. In the event of excess power generation, the overflow energy is stored in storage devices 19.

When net consumption exceeds the generating capacity of generators 11, energy stored in storage devices 19 is used. If the situation of high power consumption is maintained, such that the stored power is reduced to below a minimum threshold, power from the electrical system of the tanker aircraft is used to maintain a constant level of stored power in storage devices 19. In this way the power demand placed on the tanker aircraft will only be what is needed to maintain the load in storage devices 19, thus it would only be the average of the excess power required above the generating capacity of generators 11. Furthermore, this demand for power is averaged over the elapsed time of the mission, in such a way that if the situation arises a constant power need, without spikes, would be required from the tanker aircraft for maintaining a constant current load to storage devices 19. This process is administered by rectifiers 15 associated to the electrical system of the tanker aircraft and by administrating elements 21. The power consumption spikes required for the actuators are supplied by storage devices 19. Thus, independently of the ongoing refueling operation, the electrical system of the tanker aircraft is only required to supply a constant low power flow that does not represent an excessive load with respect to the installed capacity of the aircraft.

In the event that it is not possible to use power from the tanker aircraft, storage devices 19 allow supplying power to the refueling devices and maintaining operations without degrading performance for a duration in accordance with their storage capacity.

Storage devices 19 also enable operations on land of the refueling devices, without the need of the base aircraft providing electrical power, which is an additional advantage with respect of maintenance, auto-diagnostics and operations in unprepared air bases.

Although the instant invention has been disclosed entirely in connection with the preferred embodiments, it is clear that those modifications that are within its scope may be introduced, and that the invention should not be considered limited by the previous embodiments, but rather to the content of the following claims.

The invention claimed is:

1. A system for air to air refueling installed in a tanker aircraft, comprising:
   at least two hose and drogue refueling devices housed in pods located underneath wings of the aircraft, each of the two hose and drogue refueling devices including a plurality of components actuated by electrical actuators; and
   an electrical system of the system for air to air refueling that is formed by two subsystems, each of the two subsystems including:
      an electric generator actuated by a wind turbine located in one of the pods of one of said hose and drogue refueling devices;
      an energy storage device;
      a connection to an aircraft electrical system; and
      an administrating device equipped with a device to ensure generation and storage of energy required for responding to electrical needs of the system for air to air refueling without utilizing the aircraft electrical system except in an event that energy stored in said energy storage device falls below a preset value.

2. The system for air to air refueling in accordance with claim 1, in which said hose and drogue refueling devices each include at least the following electrical actuators:
   an actuator to control a propeller speed of the wind turbine,
   an actuator to wind a drum of a hose, and
   an actuator for a fuel pump.

3. The system for air to air refueling in accordance with any of claims 1-2, which also comprises a hose and drogue refueling device in a central fuselage that includes at least:
   an electrical actuator to wind a drum of a hose of the hose and drogue refueling device in the central fuselage, and
   an actuator for a fuel pump of the hose and drogue refueling device in the central fuselage.

4. The system for air to air refueling in accordance with claim 1, that also includes a refueling device with a mast, that includes at least the following electrical actuators:
   an actuator to hoist a drum of the mast,
   a movement actuator to telescope a beam of the mast, and
   actuators for flight airfoils of the mast.

5. The system for air to air refueling system in accordance with claim 1, in which said energy storage device comprises one or more of the following elements or a combination thereof:
   a battery,
   an ultracapacitor, and
   a flywheel.

6. The system for air to air refueling in accordance with claim 5, in which each battery is a lithium battery.

7. The system for air to air refueling in accordance with claim 1, in which:
   a voltage in a distribution network of said two subsystems is 270 Vdc;
   said electric generators are AC generators and said two subsystems include rectifiers associated with the AC generators;
   said connection to the aircraft electrical system is deployed to provide electric power with a voltage of 270 Vdc.

8. The system for air to air refueling in accordance with claim 7 in which said AC generators have a power output of between 2-10 Kw.

9. The system for air to air refueling in accordance with claim 1, wherein in the event that the energy stored in said energy storage device falls below the preset value, each administrating device equipped with the device to ensure generation and storage of the energy required for responding to the electrical needs of the system for air to air refueling administers use of the aircraft electrical system to maintain a constant level of stored power in the respective energy storage device.

10. A method for converting a commercial aircraft into a tanker aircraft, the method comprising:
   installing in the commercial aircraft the system for air to air refueling in accordance with claim 1; and
   connecting the electrical system of the system for air to air refueling to an electrical system of the commercial aircraft in such a way that a first system receives power necessary from a second at a preset constant voltage to maintain the stored energy in the electric storage devices above a preset value in the course of a refueling mission.

11. A method for administrating electric power flow in an air to air refueling system installed in a tanker aircraft comprising at least two hose and drogue refueling devices housed in pods deployed underneath wings, each of the two hose and drogue refueling devices including a plurality of components actuated by electrical actuators, the air to air refueling system comprising an electrical system, and an electrical system of the tanker aircraft including a generator of electric power, the method comprising:
   using the electrical system of the air to air refueling system which comprises two electric power generators actuated by wind turbines and two electric power storage devices before commencing a refueling mission to charge said storage devices with power generated by said two electric power generators; and
   administrating a power flow during the refueling mission providing power required by said electrical actuators using said two electric power generators and said two electric power storage devices when the electrical actuators act as energy consumers and storing in said storage devices electric power provided by said electrical actuators when the electrical actuators act as power generators;
   wherein in said using the electrical system and administrating the power flow, power generated by the electrical system of the tanker aircraft is also utilized when it becomes necessary to maintain the power stored in said energy storage devices above a preset value, and
   energy supplied by the electrical system of the tanker aircraft to the electrical system of the air to air refueling system is produced at a constant preset voltage.

12. The method in accordance with claim 11, in which said hose and drogue refueling devices each include at least the following electrical actuators:
   an actuator to control a speed of a propeller of wind turbine,
   an actuator to wind a drum of a hose, and
   an actuator for a fuel pump.

13. A method in accordance with claim 11, in which the air to air refueling system also comprises a hose and drogue refueling device located in a central fuselage and which includes at least:
- an electrical actuator to wind a drum of a hose of the hose and drogue refueling device in the central fuselage, and
- an actuator for a fuel pump of the hose and drogue refueling device in the central fuselage.

14. A method in accordance with claim 11, in which the refueling system also comprises a refueling device with a mast that includes at least the following electrical actuators:
- an actuator to hoist a drum of the mast;
- a movement actuator to telescope a beam of the mast; and
- actuators for flight airfoils of the mast.

15. A system for air to air refueling installed in a tanker aircraft, comprising:
- at least two hose and drogue refueling devices housed in pods located underneath wings of the aircraft, each of the two hose and drogue refueling devices including a plurality of components actuated by electrical actuators; and
- an electrical system of the system for air to air refueling that is formed by two subsystems, each of the two subsystems including:
  - an electric generator actuated by a wind turbine located in one of the pods of one of said hose and drogue refueling devices;
  - an energy storage device;
  - a connection to an aircraft electrical system; and
  - control circuitry configured to ensure generation and storage of energy required for responding to electrical needs of the system for air to air refueling without utilizing the aircraft electrical system except in an event that energy stored in said energy storage device falls below a preset value.

* * * * *